(12) United States Patent
Lee et al.

(10) Patent No.: US 7,976,274 B2
(45) Date of Patent: Jul. 12, 2011

(54) METHODS AND APPARATUS FOR ASSEMBLING TURBINE ENGINES

(75) Inventors: Ching-Pang Lee, Cincinnati, OH (US);
Joseph M. Guentert, Cincinnati, OH (US); Wenfeng Lu, Mason, OH (US);
Mitchell E. Iles, Burlington, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/297,699

(22) Filed: Dec. 8, 2005

(65) Prior Publication Data
US 2007/0134089 A1    Jun. 14, 2007

(51) Int. Cl.
*F01D 9/04* (2006.01)

(52) U.S. Cl. .................... 415/190; 415/209.3

(58) Field of Classification Search ............ 415/189, 415/190, 209.2, 209.3, 209.4, 210.1
See application file for complete search history.

(56) References Cited

U.S. PATENT DOCUMENTS

| | | | | |
|---|---|---|---|---|
| 4,821,522 A | * | 4/1989 | Matthews et al. | 60/757 |
| 5,169,287 A | * | 12/1992 | Proctor et al. | 415/115 |
| 5,233,828 A | | 8/1993 | Napoli | |
| 5,249,920 A | | 10/1993 | Shepherd et al. | |
| 5,271,714 A | | 12/1993 | Shepherd et al. | |
| 5,279,127 A | | 1/1994 | Napoli | |
| 5,291,732 A | | 3/1994 | Halila | |
| 5,470,198 A | * | 11/1995 | Harrogate et al. | 415/115 |
| 5,685,157 A | | 11/1997 | Pandalai et al. | |
| 5,813,832 A | | 9/1998 | Rasch et al. | |
| 6,269,646 B1 | | 8/2001 | Lovett et al. | |
| 6,287,075 B1 | | 9/2001 | Kercher | |
| 6,354,797 B1 | | 3/2002 | Heyward et al. | |
| 6,398,489 B1 | | 6/2002 | Burdgick et al. | |
| 6,419,446 B1 | * | 7/2002 | Kvasnak et al. | 415/191 |
| 6,655,147 B2 | | 12/2003 | Farmer et al. | |
| 6,676,369 B2 | | 1/2004 | Brauer et al. | |
| 6,758,477 B2 | | 7/2004 | Brauer et al. | |
| 6,773,234 B2 | | 8/2004 | Sinha et al. | |

(Continued)

FOREIGN PATENT DOCUMENTS

EP    1231358 A2    8/2002

(Continued)

OTHER PUBLICATIONS

Japanese Office Action and English language translation of the Cited References and Background Arts for co-pending JP patent application No. 2006-332428 (4 pages).

*Primary Examiner* — Nathaniel Wiehe
(74) *Attorney, Agent, or Firm* — William Scott Andes, Esq.; Armstrong Teasdale LLP

(57) ABSTRACT

A method facilitates the assembly of a gas turbine engine. The method of assembly comprises providing a turbine nozzle including an inner band, an outer band, at least one vane extending between the inner and outer bands, and at least one leading edge fillet extending between the at least one vane and at least one of the inner and outer bands, wherein a leading edge of the at least one vane is downstream from the leading edges of the inner and outer bands, and coupling the turbine nozzle within the gas turbine engine such that the leading edge fillet is configured to facilitate minimizing vortex formation along the vane leading edge adjacent at least one of the inner and outer bands.

17 Claims, 5 Drawing Sheets

U.S. PATENT DOCUMENTS

| | | |
|---|---|---|
| 6,969,232 B2 | 11/2005 | Zess et al. |
| 7,097,417 B2 * | 8/2006 | Liang .............................. 415/115 |
| 7,217,096 B2 * | 5/2007 | Lee .............................. 416/97 R |
| 7,625,181 B2 | 12/2009 | Matsuda et al. |

FOREIGN PATENT DOCUMENTS

| | | |
|---|---|---|
| EP | 1688586 A1 | 8/2006 |
| EP | 1176284 B1 | 1/2008 |
| JP | 2001254604 A | 9/2001 |
| JP | 2002138802 A | 5/2002 |
| JP | 2002276303 A | 9/2002 |
| JP | 2004169655 A | 6/2004 |
| JP | 2004278517 A | 10/2004 |
| JP | 2005133697 A | 5/2005 |
| JP | 2002138802 A5 | 9/2008 |
| WO | 2004038180 A1 | 5/2004 |

* cited by examiner

METHODS AND APPARATUS FOR ASSEMBLING TURBINE ENGINES

BACKGROUND OF THE INVENTION

This invention relates generally to turbine engines and more particularly, to methods and apparatus for assembling gas turbine engines.

Known gas turbine engines include combustors which ignite fuel-air mixtures which are then channeled through a turbine nozzle assembly towards a turbine. At least some known turbine nozzle assemblies include a plurality of arcuate nozzle segments arranged circumferentially. At least some known turbine nozzles include a plurality of circumferentially-spaced hollow airfoil vanes coupled by integrally-formed inner and outer band platforms. More specifically, the inner band forms a portion of the radially inner flowpath boundary and the outer band forms a portion of the radially outer flowpath boundary.

Within known engine assemblies, an interface defined between the turbine nozzle and an aft end of the combustor is known as a fish-mouth seal. More specifically, within such engine assemblies, leading edges of the turbine nozzle outer and inner band platforms are generally axially aligned with respect to a leading edge of each airfoil vane extending therebetween. Accordingly, in such engine assemblies, when hot combustion gases discharged from the combustor approach the nozzle vane leading edge, a pressure or bow wave reflects from the vane leading edge stagnation and propagates a distance upstream from the nozzle assembly, causing circumferential pressure variations across the band leading edges and a non-uniform gas pressure distribution. The pressure variations may cause localized nozzle oxidation and/or localized high temperature gas injection, each of which may decrease engine efficiency. Moreover, such pressure variations may also cause the vane leading edge to operate at an increased temperature in comparison to the remainder of the vane.

BRIEF SUMMARY OF THE INVENTION

In one aspect, a method for assembling a gas turbine engine is provided. The method comprises providing a turbine nozzle including an inner band, an outer band, at least one vane extending between the inner and outer bands, and at least one leading edge fillet extending between the at least one vane and at least one of the inner and outer bands, wherein a leading edge of the at least one vane is downstream from the leading edges of the inner and outer bands, and coupling the turbine nozzle within the gas turbine engine such that the leading edge fillet is configured to facilitate minimizing vortex formation along the vane leading edge adjacent at least one of the inner and outer bands.

In another aspect, a turbine engine nozzle assembly is provided. The turbine engine nozzle assembly includes an outer band, an inner band, at least one vane, and a leading edge fillet. The outer and inner bands each include a leading edge, a trailing edge, and a body extending therebetween. The at least one vane extends between the outer and inner bands. The at least one vane includes a first sidewall and a second sidewall connected together at a leading edge and a trailing edge. The at least one vane leading edge is positioned downstream from the inner and outer band leading edges. The leading edge fillet extends between the at least one vane and at least one of the inner-band and the outer band. The leading edge fillet is configured to facilitate minimizing vortex formation along the vane leading edge adjacent at least one of the inner and outer bands.

In a further aspect, a gas turbine engine is provided. The engine includes a combustor and a turbine nozzle assembly that is downstream from and in flow communication with the combustor. The nozzle assembly includes an outer band, an inner band, at least one vane extending between the outer and inner bands, and a leading edge fillet. The outer band and inner band each include a leading edge and each is coupled to an aft end of the combustor. The at least one vane includes a first sidewall and a second sidewall connected together at a leading edge and a trailing edge. The at least one vane leading edge is positioned downstream from the inner and outer band leading edges. The leading edge fillet extends between the at least one vane and at least one of the inner band and the outer band. The leading edge fillet is configured to facilitate minimizing vortex formation along the vane leading edge.

DETAILED DESCRIPTION OF THE INVENTION

Figure 1:
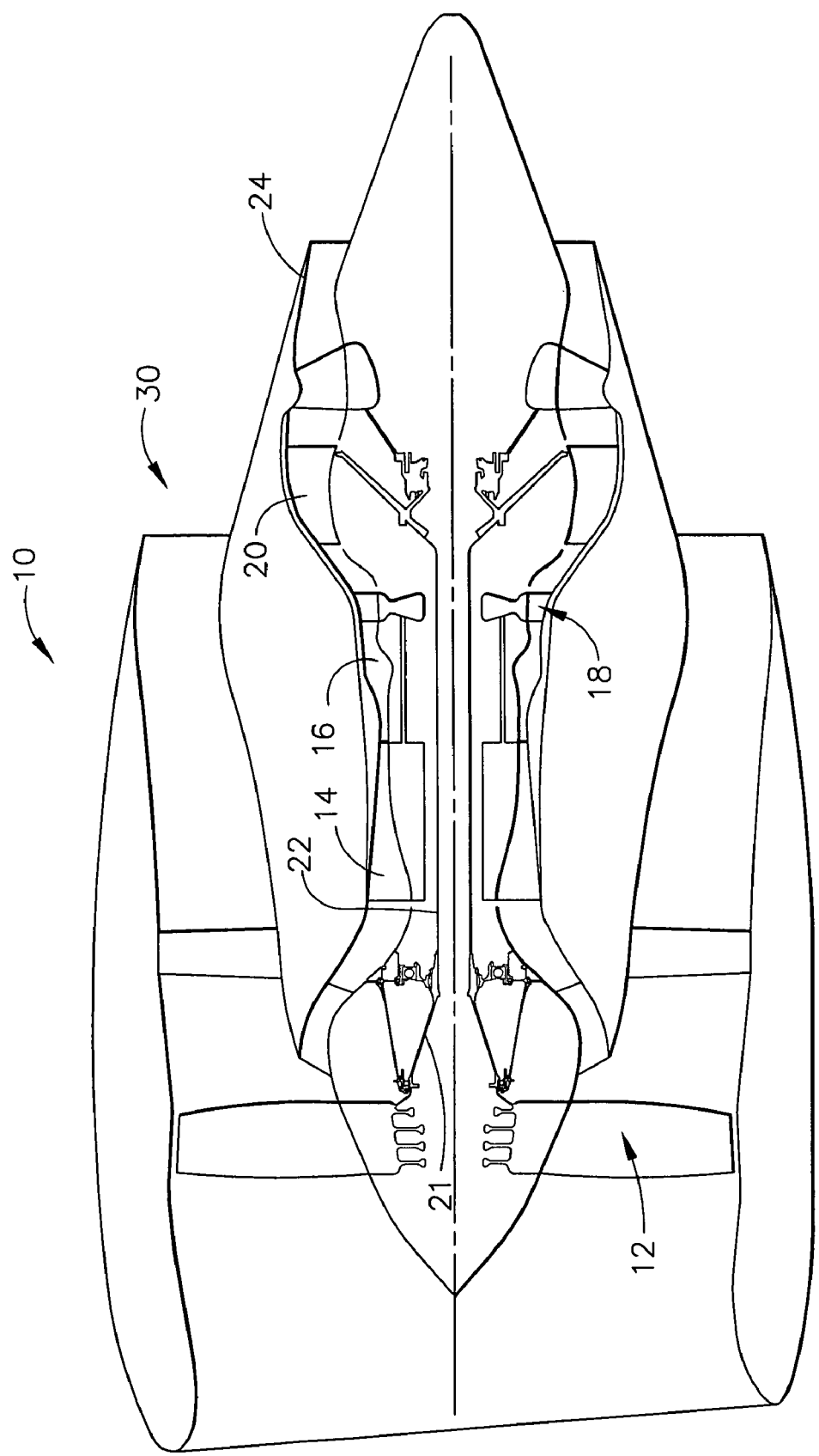
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22. In one embodiment, gas turbine engine 10 is an LM2500 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle (not shown in FIG. 1) to drive turbines 18 and 20, prior to exiting gas turbine engine 10 through an exhaust nozzle 24.

Figure 2:
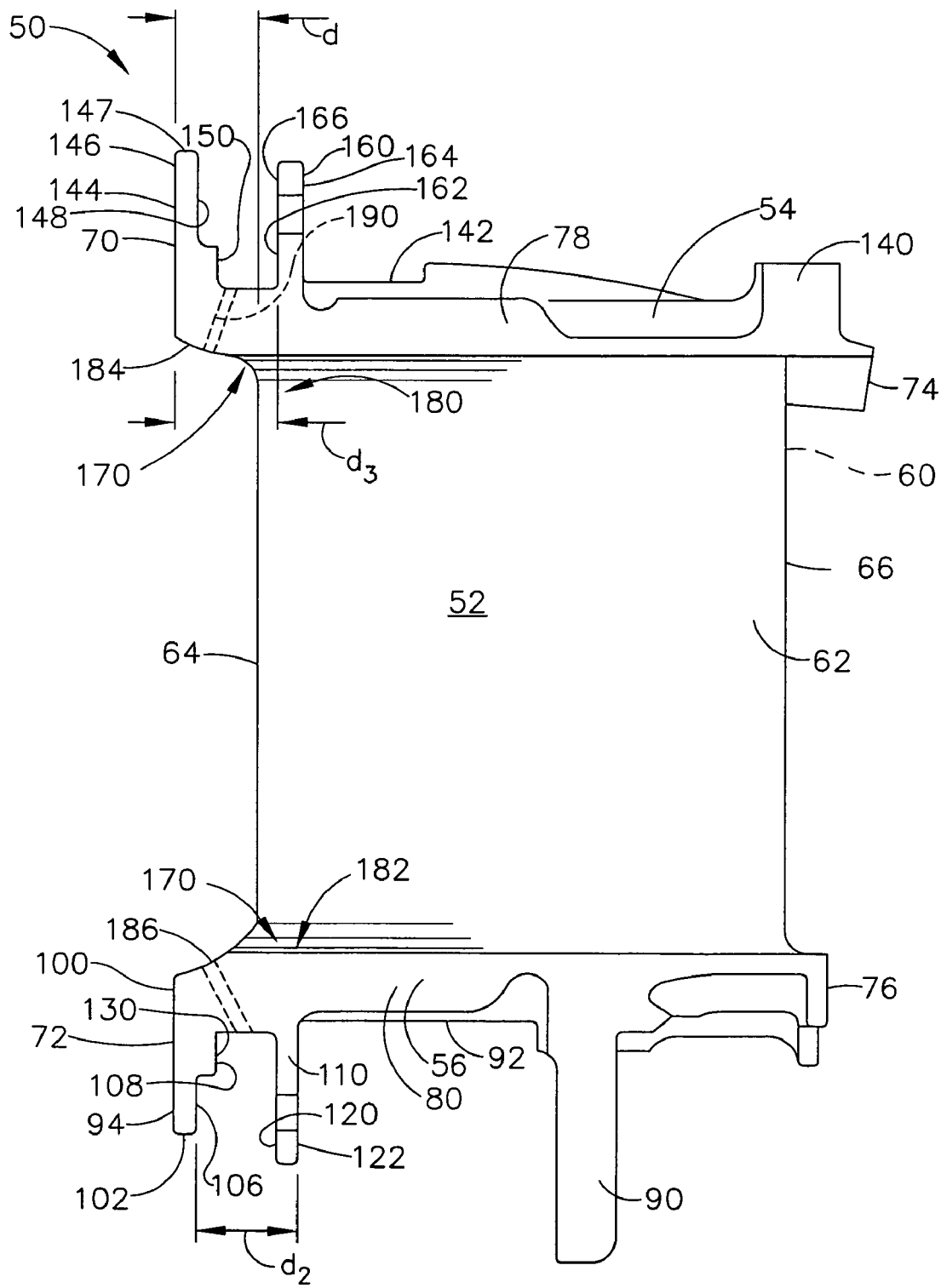
FIG. 2 is a side view of an exemplary turbine nozzle that may be used with the gas turbine engine shown in FIG. 1.
Figure 3:
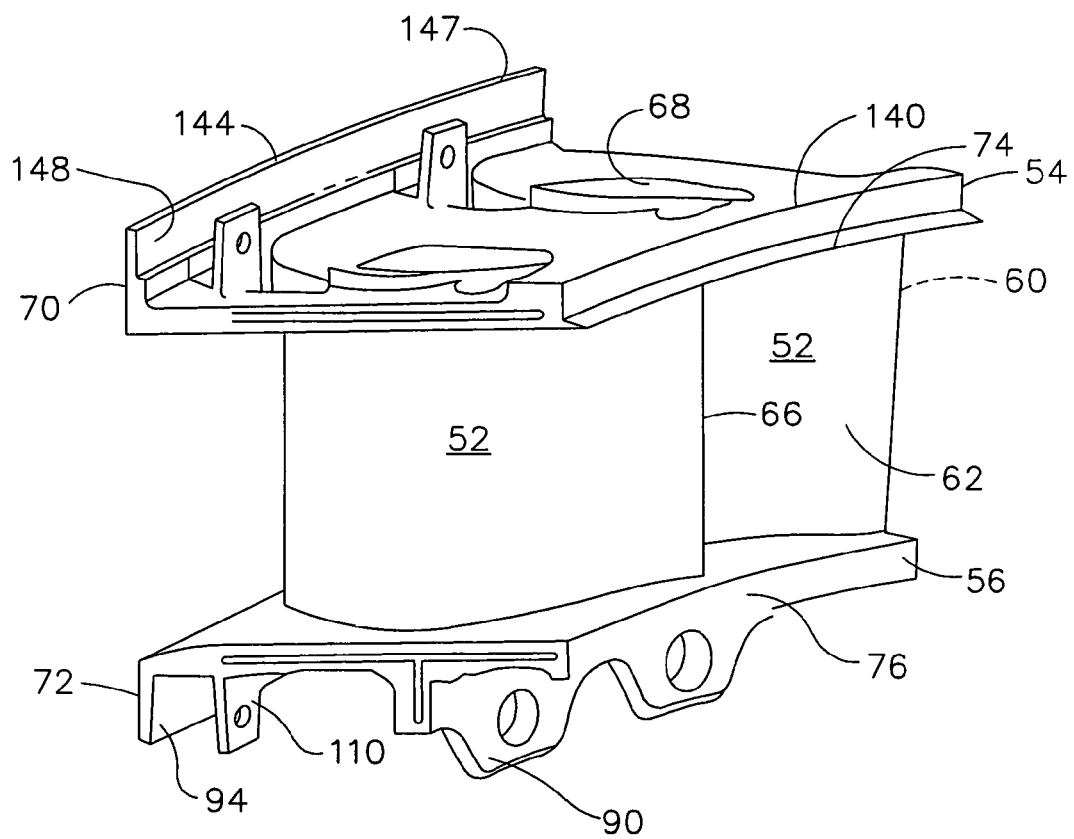
FIG. 3 is a perspective view of the turbine nozzle shown in FIG. 2.

FIG. 2 is a side view of an exemplary turbine nozzle 50 that may be used with a gas turbine engine, such as turbine engine 10 (shown in FIG. 1). FIG. 3 is a perspective view of turbine nozzle 50. In the exemplary embodiment, nozzle 50 is one segment of a plurality of segments that are positioned circumferentially to form a nozzle assembly (not shown) within the gas turbine engine. Nozzle 50 includes at least one airfoil vane 52 that extends between an arcuate radially outer band or platform 54, and an arcuate radially inner band or platform 56. More specifically, in the exemplary embodiment, outer band 54 and the inner band 56 are each integrally-formed with airfoil vane 52.

Vane 52 includes a pressure-side sidewall 60 and a suction-side sidewall 62 that are connected at a leading edge 64 and at an chordwise-spaced trailing edge 66 such that a cooling cavity 68 is defined between sidewalls 60 and 62. Vane sidewalls 60 and 62 each extend radially between bands 54 and 56 and in the exemplary embodiment, sidewall 60 is generally concave, and sidewall 62 is generally convex.

Outer and inner bands 54 and 56 each include a leading edge 70 and 72, respectively, a trailing edge 74 and 76, respectively, and a platform body 78 and 80, respectively, extending therebetween. Airfoil vane(s) 52 are oriented such that outer and inner band leading edges 70 and 72, respectively, are each a distance d upstream from airfoil vane leading edge 64. Distance d is variably selected to ensure that leading edges 70 and 72 are upstream from vane leading edge 64, and to facilitate bands 54 and 56 preventing hot gas injections along vane leading edge 64, as described in more detail below.

In the exemplary embodiment, inner band 56 includes an aft flange 90 that extends radially inwardly therefrom. More specifically, flange 90 extends radially inwardly from band 56 with respect to a radially inner surface 92 of band 56. Inner band 56 also includes a forward flange 94 that extends radially inward therefrom. Forward flange 94 is positioned between inner band leading edge 72 and aft flange 90, and extends radially inwardly from band 56. In the exemplary embodiment, an upstream side 100 of forward flange 94 is substantially planar between a radially outermost surface 102 of flange 94 and radially inner surface 92. Moreover, in the exemplary embodiment, a downstream side 106 of flange 94 includes a shoulder 108, such that flange downstream side 106 is substantially planar from flange surface 102 to shoulder 108, and from shoulder 108 to radially inner surface 92.

Inner band 56 also includes a plurality of circumferentially-spaced radial tabs 110 that extend radially inwardly therefrom. More specifically, in the exemplary embodiment, the number of radial tabs 110 is the same as the number of vanes 52. In the exemplary embodiment, each tab 110 includes a substantially parallel upstream and downstream surfaces 120 and 122, respectively. Radial tabs 110 are spaced a distance $d_2$ downstream from forward flange 94 such that a retention channel 130 is defined between each radial tab 110 and forward flange 94.

In the exemplary embodiment, outer band 54 includes an aft flange 140 that extends generally radially outwardly therefrom. More specifically, flange 140 extends radially outwardly from band 54 with respect to a radially outer surface 142 of band 54. Outer band 54 also includes a forward flange 144 that extends radially outward therefrom. Forward flange 144 is positioned between outer band leading edge 70 and aft flange 140, and extends radially inwardly from band 54. In the exemplary embodiment, an upstream side 146 of forward flange 144 is substantially planar between a radially outermost surface 147 of flange 144 and radially outer surface 142. Moreover, in the exemplary embodiment, a downstream side 148 of flange 144 includes a shoulder 150, such that flange downstream side 148 is substantially planar from flange surface 147 to shoulder 150, and from shoulder 150 to radially outer surface 142.

Outer band 54 also includes a plurality of circumferentially-spaced radial tabs 160 that extend radially outwardly therefrom. More specifically, in the exemplary embodiment, the number of radial tabs 160 is the same as the number of vanes 52. In the exemplary embodiment, each tab 160 includes substantially parallel upstream and downstream surfaces 162 and 164, respectively. Radial tabs 160 are spaced a distance $d_3$ downstream from forward flange 144 such that a retention channel 166 is defined between each radial tab 160 and forward flange 144. In the exemplary embodiment, channels 166 are approximately the same size as channels 130.

Turbine nozzle 50 also includes a plurality of leading edge fillets 170. Fillets 170 are generally larger than fillets used with known turbine nozzles and extend between outer platform 54 and vane 52 in a tip area 180 of each vane leading edge 64, and between inner platform 56 and vane 52 in a hub area 182 of each vane leading edge 64. Specifically, within tip area 180, fillets 170 are blended from vane leading edge 64 across a radially inner surface 184 of outer platform 54 and towards outer band leading edge 70. Moreover, within hub area 182, fillets 170 are blended from vane leading edge 64 across a radially outer surface 186 of inner platform 56 and towards inner band leading edge 72. Accordingly, nozzle vane leading edge 64 is enlarged within both hub area 182 and tip area 180 such that fillets 170 facilitate accelerating the flow passing thereby.

In the exemplary embodiment, fillets 170 are formed with a plurality of cooling openings 190 that extend through fillets 170 and are configured to discharge cooling air inwardly into the boundary flow flowing over vane 52. Specifically, each cooling opening 190 is oriented towards a pitch-line of vane 52 and such that openings 190 facilitate energizing the flow momentum in the boundary layer, such that the formation of horseshoe vortices upstream from leading edge 64 is facilitated to be reduced. The reduction in the formation of the horseshoe vortices facilities improving aerodynamic efficiency. Moreover, the plurality of cooling openings 190 also facilitate reducing surface heating and an operating temperature of vane 52.

During operation, the location of inner and outer bands 56 and 54, respectively, with respect to vane leading edge 64 facilitates reducing hot gas injections along vane leading edge 64. Rather, the combination of enlarged fillets 170 and cooling holes 190 facilitates accelerating the flow and energizing the flow momentum in the boundary layer, such that the formation of horseshoe vortices are facilitated to be reduced. As a result, aerodynamic efficiency is facilitated to be improved and the operating temperature of nozzle airfoil vane 52 is facilitated to be reduced. As such, a useful life of turbine nozzle 50 is facilitated to be extended.

Figure 4:
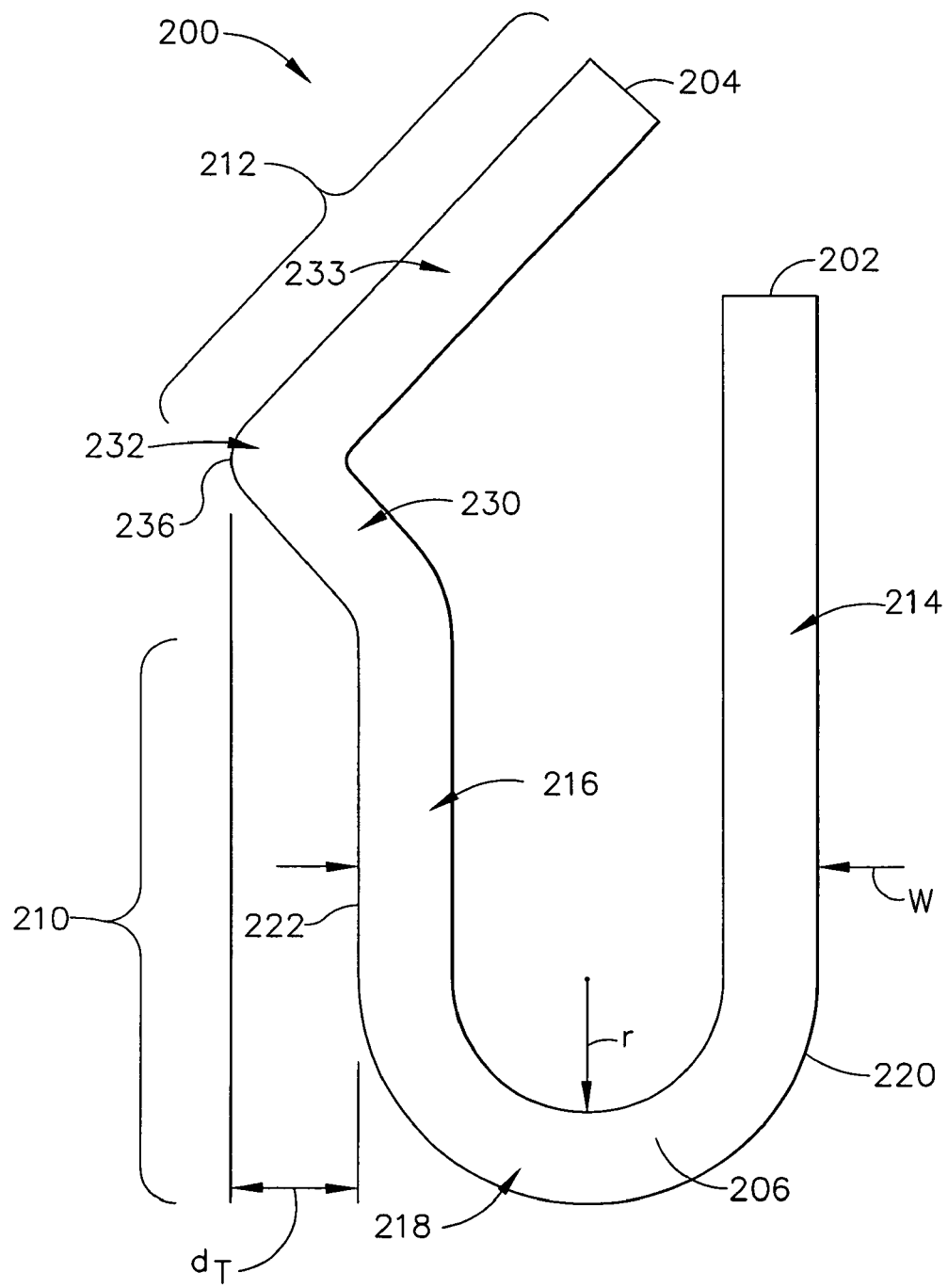
FIG. 4 is an enlarged side view of an exemplary retainer that may be used with the turbine nozzle shown in FIGS. 2 and 3.

FIG. 4 is an enlarged side view of an exemplary retainer 200 that may be used with turbine nozzle 50 (shown in FIGS. 2 and 3). In the exemplary embodiment, retainer 200 is known as a spring clip and is configured to facilitate coupling nozzle 50 to an aft end of combustor 16 in a sealing arrangement as described in more detail below. Retainer 200 includes a pair of opposite ends 202 and 204, and a body 206 extending therebetween. In the exemplary embodiment, body 206 includes an insertion portion 210 and a retention portion 212 that extends integrally from insertion portion 210.

Insertion portion 210 is generally U-shaped and extends from end 204 to insertion portion 210, and retention portion 212 extends from insertion portion 210 to end 204. Accordingly, insertion portion 210 includes a pair of opposed legs 214 and 216 that are connected by an arcuate portion 218. In the exemplary embodiment, portion 218 is substantially semi-circular. Arcuate portion 218 has a radius r that is sized to enable legs 214 and 216 to define a width w of retainer 200, measured with respect to an outer surface 220 and 222 of legs 214 and 216, respectively, that is narrower than a width, i.e., distance $d_2$, of channel 166 or channel 130. Accordingly, insertion portion 210 is sized for insertion within retention channels 166 and 130.

Retention portion 212 includes a first leg 230 that extends obliquely outward from leg 216 to an apex 232 and a second leg 233 that extends obliquely from apex 232 towards leg 214. As such, a tip 236 of apex 232 is a distance $d_T$ from leg outer surface 222.

In the exemplary embodiment, retainer 200 is fabricated from a resilient material that resists deformation. In an alternative embodiment, retainer 200 is fabricated from a shape memory material. In a further alternative embodiment, retainer 200 is fabricated from any material that enables retainer 200 to function as described herein.

Figure 5:
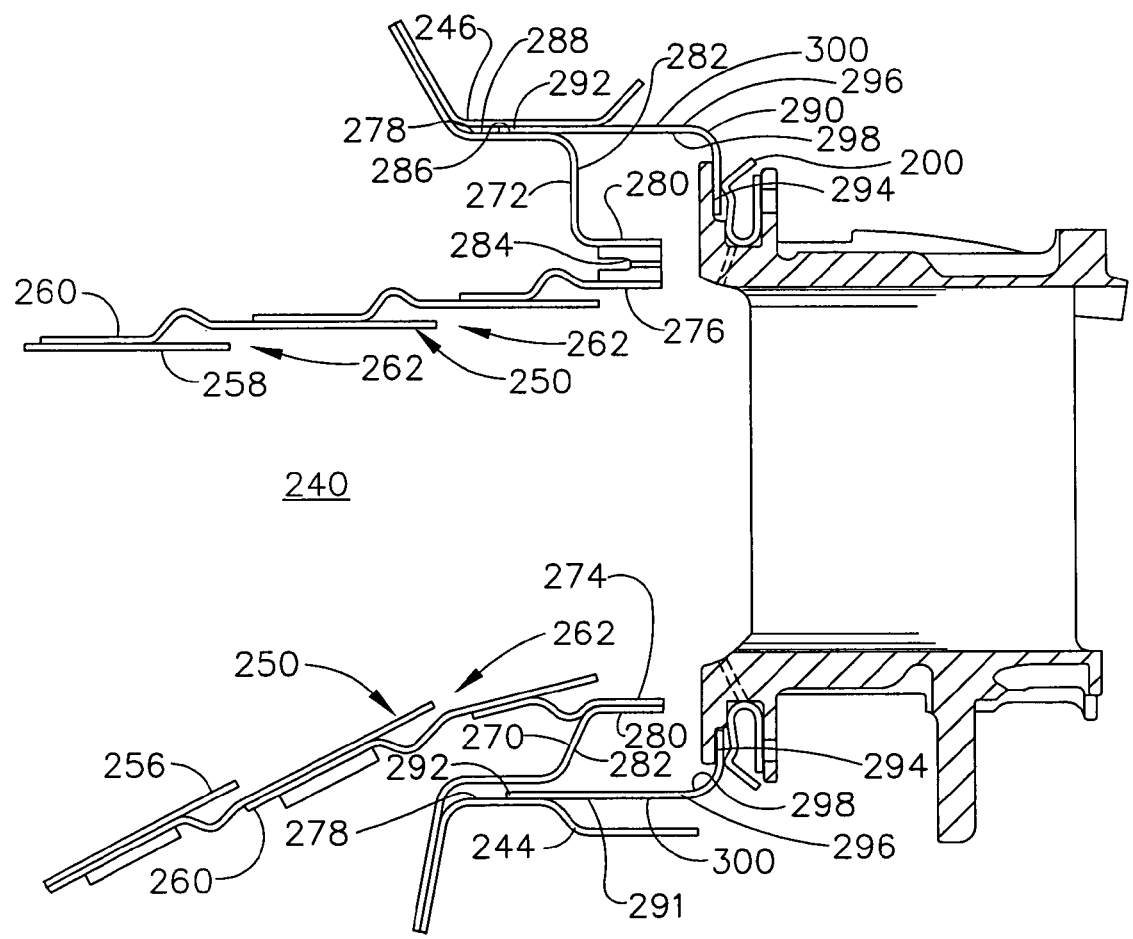
FIG. 5 is a side view of the turbine nozzle shown in FIGS. 2 and 3 coupled to a combustor that may be used with the engine shown in FIG. 1 with the retainer shown in FIG. 4.

FIG. 5 is a side view of turbine nozzle 50 coupled to combustor 16 using retainer 200. Combustor 16 includes a combustion zone 240 that is formed by annular, radially inner and radially outer supporting members 244 and 246, respectively, and combustor liners 250. Combustor liners 250 shield the outer and inner supporting members from heat generated within combustion zone 240. More specifically, combustor 16 includes an annular inner liner 256 and an annular outer liner 258. Liners 256 and 258 define combustion zone 240 such that combustion zone 240 extends from a dome assembly (not shown) downstream to turbine nozzle 50. Outer and inner liners 258 and 256 each include a plurality of separate panels 260 which include a series of steps 262, each of which form a distinct portion of combustor liners 250.

Each liner 256 and 258 also includes an annular support flange, or aft flange, 270 and 272, respectively. Specifically, each support flange 270 and 272 couples an aft end 274 and 276 of each respective liner 256 and 258 to supporting members 244 and 246. More specifically, the coupling of each support flange 270 and 272 to each supporting member 244 and 246 forms an annular gap or fishmouth opening 278.

Each support flange 270 and 272 includes a radial portion 280 and a conical datum area 282. Each radial portion 280 is formed with a plurality of preferential cooling openings or jets 284 that extend therethrough to facilitate discharging cooling air towards nozzle 50. Air discharged from jets 284 facilitates reducing the formation of horseshoe vortices upstream from vane leading edge 64 and thus facilitates improving aerodynamic efficiency of nozzle 50. Each conical datum area 282 extends integrally outward and upstream from each radial portion 280 such that conical datum area 282 defines a radially inner portion 286 of each fishmouth opening 278. A radial outer portion 288 of each fishmouth opening 278 is defined by each supporting member 244 or 246. Fishmouth opening 278 is used to couple a pair of annular ring interfaces 290 and 291 between combustor 16 and nozzle 50.

In the exemplary embodiment, interfaces 290 and 291 are substantially similar and each has a substantially L-shaped cross-sectional profile and includes an upstream edge 292, a downstream edge 294, and a body 296 extending therebetween. Body 296 includes a radially inner surface 298 and an opposite radially outer surface 300. In the exemplary embodiment, interface upstream edge 292 is securely coupled within fishmouth opening 278 and interface downstream edge 294 is inserted within retention channel 166 such that the portion of body inner surface 298 within channel 166 is positioned against the substantially planar portion of nozzle forward flange 144 extending between shoulder 150 and flange surface 147. Similarly, along inner band 56, the downstream edge 294 of interface 291 is inserted within retention channel 130 such that the portion of body inner surface 298 within channel 130 is positioned against the substantially planar portion of nozzle forward flange 94 extending between shoulder 108 and flange surface 102.

After interfaces 290 and 291 are positioned within channels 166 and 130, respectively, a retainer 200 is inserted within each retention channel 166 and 130 such that leg outer surface 220 is positioned against a respective radial tab 160 and 110. More specifically, when fully inserted within channels 166 and 130, each retainer apex 232 is biased against, and in contact with, interfaces 290 and 291. Specifically, each retainer 200 is positioned in contact against each interface radially outer surface 300 such that interface radially inner surface 298 is biased in sealing contact within each channel 130 and 166 against each respective nozzle forward flange 94 and 144. In an alternative embodiment, retainers 200 are not used to couple interfaces 290 and 291 against flanges 94 and 144, but rather other suitable means for securing interfaces 290 and/or 291 in sealing contact against flanges 94 and 144 may be used, such as, but not limited to, inserting fasteners through radial tabs 110 and/or 166, or bending radial tabs 110 and 166 against flanges 94 and 144.

When the engine is fully assembled, interfaces 290 and 291 provide structural support to combustor 16 and facilitate sealing between combustor 16 and nozzles 50. As such, a mechanically flexible seal arrangement is provided which provides structural stability and support to the aft end of combustor 16. Moreover, the assembly of interface rings 290 and 291 between combustor 16 and nozzle 50 is generally less labor intensive and less time-consuming than the assembly of known seal interfaces used with other gas turbine engines.

In each embodiment, the above-described turbine nozzles include an inner band and an outer band that each extend upstream a distance from the vane leading edge to facilitate reducing hot gas injection along the vane leading edge. Moreover, because each inner and outer band extends upstream from the vane leading edge, each band accommodates enlarged fillets in comparison to known turbine nozzles. The combination of the inner and outer bands, the impingement jets extending through the combustor support flanges, and the cooling openings extending through the fillets facilitates reducing an operating temperature of the nozzle vanes, reducing the formation of horseshoe vortices upstream from each vane leading edge, and improving the aerodynamic efficiency of the nozzle. Moreover, the interface rings extending between the combustor and the turbine nozzle provide structural support to the combustor while being biased in a sealing arrangement with the turbine nozzle. As a result, a useful life of the turbine nozzle is facilitated to be extended in a reliable and cost effective manner.

Exemplary embodiments of turbine nozzles are described above in detail. The interface rings, fillets, and cooling openings and jets are not limited to use with the specific nozzle embodiments described herein, but rather, the such components can be utilized independently and separately from other turbine nozzle components described herein. Moreover, the invention is not limited to the embodiments of the nozzle assemblies described above in detail. Rather, other variations of nozzles assembly embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

providing a turbine nozzle including an inner band, an outer band, and a vane extending between the inner and outer bands, each of the inner and outer bands including a radial tab, a forward flange having a leading edge, and an upstream portion that extends downstream from the forward flange to the radial tab such that a retention channel is defined between the forward flange and the radial tab, the retention channel sized to receive a retainer, wherein a radially outer surface of the inner band upstream portion curves inwardly towards the inner band leading edge and wherein a radially inner surface of the outer band upstream portion curves outwardly towards the outer band leading edge; the turbine nozzle including; a first leading edge fillet between the vane and the outer band structured to substantially blend with the radially inner surface of the outer band upstream portion, a second leading edge fillet between the vane and the inner band structured to substantially blend with the radially outer surface of the inner band upstream portion, and an opening extending through each of the first and second leading edge fillets, wherein the opening is oriented to discharge cooling air towards a pitch-line of the vane; and coupling the turbine nozzle within the gas turbine engine such that the first and second leading edge fillets facilitate minimizing vortex formation near the vane and adjacent the inner and outer bands, wherein coupling the turbine nozzle within the gas turbine engine includes positioning a retainer at least partially within the retention channel.

2. A method in accordance with claim 1 wherein coupling the turbine nozzle within the gas turbine engine further comprises coupling the turbine nozzle within the gas turbine engine such that the inner and outer bands are configured to facilitate preventing hot gas ingestion across a leading edge of the vane.

3. A method in accordance with claim 1 wherein forming an opening further comprises forming a plurality of openings to facilitate energizing boundary layer flow adjacent the vane.

4. A method in accordance with claim 1 wherein forming an opening further comprises forming a plurality of openings to facilitate extending a useful life of the turbine nozzle assembly.

5. A gas turbine engine in accordance with claim 1 wherein coupling the turbine nozzle within the gas turbine engine includes positioning a an interface between the turbine nozzle and a combustor at least partially within the retention channel.

6. A turbine engine nozzle assembly comprising:

an outer band comprising at least two circumferentially-spaced outer band radial tabs, an outer band forward flange comprising a leading edge, an outer band upstream portion extending downstream from said outer band forward flange to said outer band radial tabs, and an outer band retention channel defined between said outer band forward flange and each of said outer band radial tabs, each of said outer band retention channels sized to receive an outer band retainer, wherein a radially inner surface of said outer band upstream portion curves outwardly towards said outer band leading edge;

an inner band comprising at least two circumferentially-spaced inner band radial tabs, an inner band forward flange comprising a leading edge, an inner band upstream portion extending downstream from said-inner band forward flange to said inner band radial tabs, and an inner band retention channel defined between said inner band forward flange and each of said inner band radial tabs, said inner band retention channels sized to receive an inner band retainer, wherein a radially outer surface of said inner band upstream portion curves inwardly towards said inner band leading edge;

a first leading edge fillet extending between said vane and said outer band, wherein said first leading edge fillet substantially blends with said radially inner surface of said outer band upstream portion; and a second leading edge fillet extending between said vane and said inner band, wherein said second leading edge fillet substantially blends with said radially outer surface of said inner band upstream portion, said first and second leading edge fillets configured to facilitate minimizing vortex formation near said vane and adjacent said inner and outer bands, wherein each of said radially inner surface and said radially outer surface comprises an opening extending therethrough for discharging cooling air towards a pitch-line of said vane.

7. A turbine engine nozzle assembly in accordance with claim 6 wherein said first and second leading edge fillets facilitate accelerating a flow through said nozzle assembly.

8. A turbine engine nozzle assembly in accordance with claim 6 wherein said vane comprises a leading edge, said inner and outer bands configured to facilitate preventing hot gas ingestion across said leading edge of said vane.

9. A turbine engine nozzle assembly in accordance with claim 6 wherein said opening facilitates extending a useful life of said engine nozzle assembly.

10. A turbine engine nozzle assembly in accordance with claim 6 wherein said inner and outer bands facilitate reducing an effect of a pressure bow wave on said nozzle assembly.

11. A turbine engine nozzle assembly in accordance with claim 6 wherein said first and second leading edge fillets facilitate reducing an operating temperature of said vane.

12. A gas turbine engine comprising:

a combustor;

a turbine nozzle assembly downstream from and in flow communication with said combustor, said nozzle assembly comprising an outer band, an inner band, a vane extending between said outer and inner bands, a first leading edge fillet extending between said vane and said outer band, and a second leading edge fillet extending between said vane and said inner band, said outer band and said inner band each comprising a radial tab, a forward flange comprising a leading edge, an upstream portion extending downstream from said forward flange to said radial tab, and a retention channel defined between said forward flange and said radial tab, said retention channel sized to receive a retainer, wherein a radially inner surface of said outer band upstream portion curves outwardly towards said outer band leading edge and wherein a radially outer surface of said inner band upstream portion curves inwardly towards said inner band leading edge, wherein each of said radially inner surface and said radially outer surface comprises an opening extending therethrough for discharging cooling air towards a pitch-line of said vane; and a retainer disposed at least partially within the retention channel for coupling said nozzle assembly to said combustor.

13. A gas turbine engine in accordance with claim 12 wherein said vane comprises a leading edge, said inner and outer bands configured to facilitate preventing hot gas ingestion along said leading edge of said vane.

14. A gas turbine engine in accordance with claim 12 wherein said inner and outer bands facilitate reducing an effect of a pressure bow wave on said nozzle assembly.

15. A gas turbine engine in accordance with claim 12 wherein said opening facilitates reducing an operating temperature of said vane.

16. A gas turbine engine in accordance with claim 12 wherein said opening is configured to facilitate minimizing vortex formation along said vane.

17. A gas turbine engine in accordance with claim 12 wherein said nozzle assembly is coupled to said combustor via at least one interface.

* * * * *